United States Patent
Baumann

(10) Patent No.: US 6,240,677 B1
(45) Date of Patent: Jun. 5, 2001

(54) SEALING OR GUIDING ASSEMBLIES AND METHODS OF MAKING THEM

(75) Inventor: Michael Baumann, Nettetal (DE)

(73) Assignee: GenCorp Property Inc., Rancho Cordova, CA (US)

( * ) Notice: Subject to any disclaimer, the term of this patent is extended or adjusted under 35 U.S.C. 154(b) by 0 days.

(21) Appl. No.: 09/341,810
(22) PCT Filed: Jan. 12, 1998
(86) PCT No.: PCT/GB98/00076
   § 371 Date: Sep. 9, 1999
   § 102(e) Date: Sep. 9, 1999
(87) PCT Pub. No.: WO98/31557
   PCT Pub. Date: Jul. 23, 1998

(30) Foreign Application Priority Data

Jan. 17, 1997 (EP) .................................... 9700935

(51) Int. Cl.⁷ ........................................ E06B 7/16
(52) U.S. Cl. ............................................ 49/479.1
(58) Field of Search .................. 49/475.1, 479.1, 49/493.1, 440, 441, 502

(56) References Cited

U.S. PATENT DOCUMENTS

| | | |
|---|---|---|
| 5,374,386 | 12/1994 | Nagata . |
| 5,463,832 | 11/1995 | Eckart . |
| 5,699,603 | 12/1997 | Backes et al. . |
| 5,839,232 | 11/1998 | Backes et al. . |

FOREIGN PATENT DOCUMENTS

| | | | |
|---|---|---|---|
| 3912897 | * | 11/1989 | (DE) . |
| 301942 | * | 2/1989 | (EP) .................................. 49/479.1 |

* cited by examiner

Primary Examiner—Jerry Redman
(74) Attorney, Agent, or Firm—Leydig, Voit & Mayer, Ltd.

(57) ABSTRACT

A window frame carried on the door of a vehicle is in the form of an aluminum extrusion having a smooth bend in the region where the top of the frame meets the corner between the "B" pillar of the vehicle and the vehicle roof. The window glass has a sharp angle matching this corner. The aluminum extrusion carries flanges directed towards but stopping short of the sharp corner. The sealing and guiding strip assembly comprises a molded part incorporating a separate metal corner piece and defining a window glass receiving channel. The metal corner piece has clips which fit in a channel on the aluminum extrusion. The molded part is concealed beneath extruded strip parts meeting at a miter join at the sharp corner. These strip parts extend away from the corner piece and form integral parts of extruded window glass receiving channels matching the channel in the molded part.

10 Claims, 4 Drawing Sheets

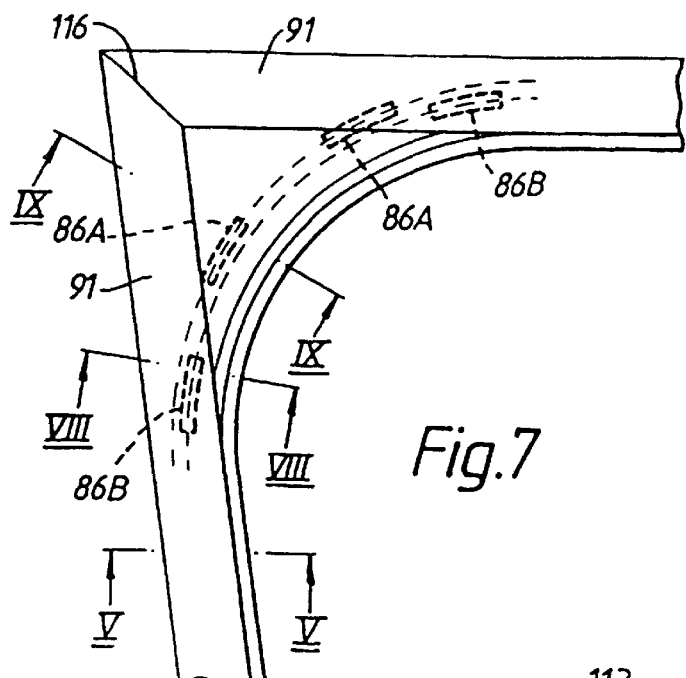
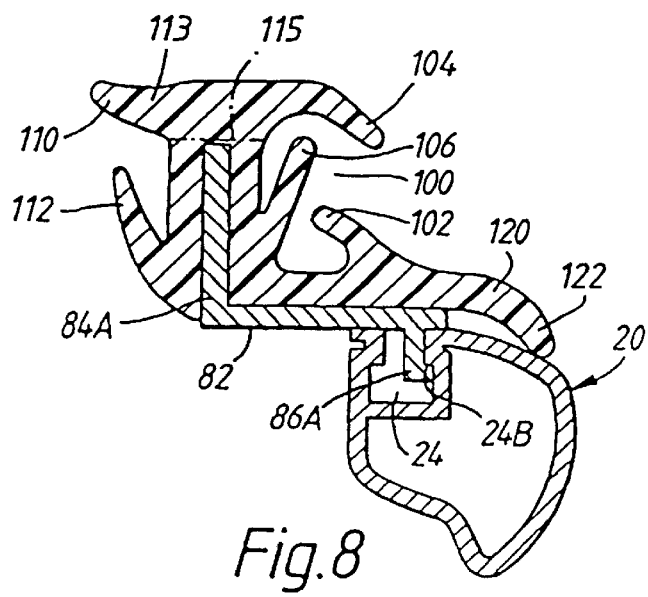
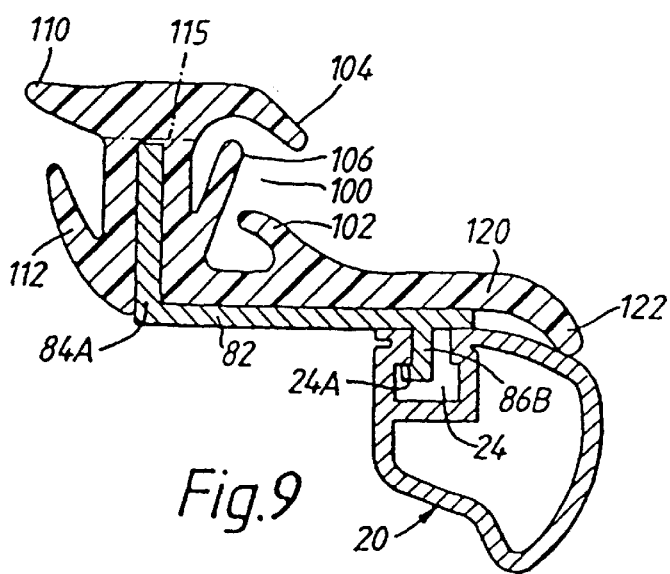

US 6,240,677 B1

SEALING OR GUIDING ASSEMBLIES AND METHODS OF MAKING THEM

BACKGROUND OF THE INVENTION

The invention relates to a sealing or guiding assembly for sealing or guiding a sharp corner of a window pane in the frame of a window opening, comprising two lengths of flexible material for contacting the window pane and respectively extending towards the corner, moulded material matching the shape of the sharp corner and attached to and between the lengths of flexible material, and a stiff corner piece matching the shape of the sharp corner and incorporated into the moulded material during the moulding thereof.

The invention also relates to a method of constructing a window frame assembly carried by the upper part of a door in a vehicle body the window pane of which defines two edges having directions meeting at a sharp angle, comprising the steps of: forming a relatively rigid window frame for the window opening, the window frame defining a smooth curve in the region of the frame corresponding to the sharp angle in the window pane; forming a stiff corner piece having an outer profile matching the sharp angle of the corner and a curved inner profile bridging across the sharp corner; incorporating the stiff corner piece in a moulded part of flexible material which defines two window-glass receiving channels meeting at the said sharp angle and sized to receive the edges of the window glass which meet at the sharp angle; locking the stiff corner piece, after incorporation into the moulded part, in the window frame; the stiff corner piece being shaped to have an outside profile matching the sharp angle and also defining a curved region which bridgingly extends across the sharp angle and which matches the said curve in the frame, and the moulded part of flexible material overlaying the curved region of the stiff corner piece; extruding lengths of channel-shaped strip of flexible material; and attaching them to the moulded part to lead in the respective said directions away from the sharp angle so that their channels are aligned with the glass-receiving channels of the moulded part.

Such an assembly and such a method are known from GB-A-2 273 951. However, it is desirable to improve the consistency of the appearance of such an assembly.

SUMMARY OF THE INVENTION

According to the invention, there is provided a sealing assembly for sealing a sharp-angled corner of a window pane in a frame of a window opening, comprising two strips of extruded flexible material for contacting the window pane and respectively extending towards the corner, each length of flexible material comprising a respective visually apparent surface portion integrally extending over and along a body portion for mounting the length of flexible material on the frame, the body portion of each strip being removed from the surface portion of the strip over a predetermined length of the strip immediately adjacent the corner, molded material matching the shape of the sharp-angled corner and matching the shapes and lengths of the removed body portions and attached to the two strips of flexible material in place of the removed body portions, and a stiff corner piece matching the shape of the sharp corner and incorporated into the molded material during the molding thereof, the respective visually apparent surface portions of the two strips of the flexible material meeting at the sharp-angled corner and overlaying and at least partly concealing and being secured to the molded material.

According to the invention, therefore, the known assembly is characterised in that respective strip-like parts of the two lengths of the flexible material overlay and at least partly conceal the moulded material.

BRIEF DESCRIPTION OF THE DRAWINGS

A window sealing and guiding strip assembly embodying the invention will now be described, by way of example only, with reference to the accompanying diagrammatic drawings in which:

FIG. 7 is a diagrammatic plan view of the assembly at the corner;

FIG. 8 is a section on the line VIII—VIII of FIG. 7; and

FIG. 9 is a section on the line IX—IX of FIG. 7.

DESCRIPTION OF THE PREFERRED EMBODIMENTS

Figure 1:
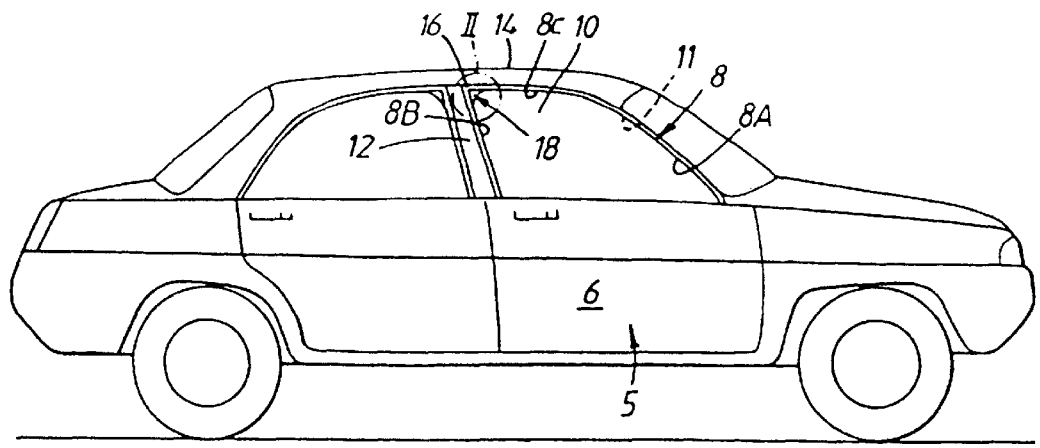
FIG. 1 is a side view of a motor vehicle body.

FIG. 1 shows the side of a motor vehicle body having a door 5 with a lower part 6 carrying a window frame indicated diagrammatically at 8 for a window opening 10. In the usual way, a window glass for the opening 10 can be raised from and lowered into the lower part 6 of the door. The frame 8 carries the sealing and guiding strip (not visible in FIG. 1) which will be described in more detail below.

The frame 8 comprises a part 8A along the sloping front of the door which is alongside the so-called "A" pillar of the vehicle body, a generally vertical part 8B alongside the so-called "B" pillar 12 of the vehicle body, and a part 8C running along the top of the door.

Where the "B" pillar 12 meets the roof 14 of the vehicle, a sharp angle (substantially 90°) is formed, at 16. In a manner to be explained below, the sealing and guiding strip assembly to be described combines with the frame 8 to form a corresponding sharp angel 18 of the frame for receiving the matching angle of the window glass.

Figure 2:
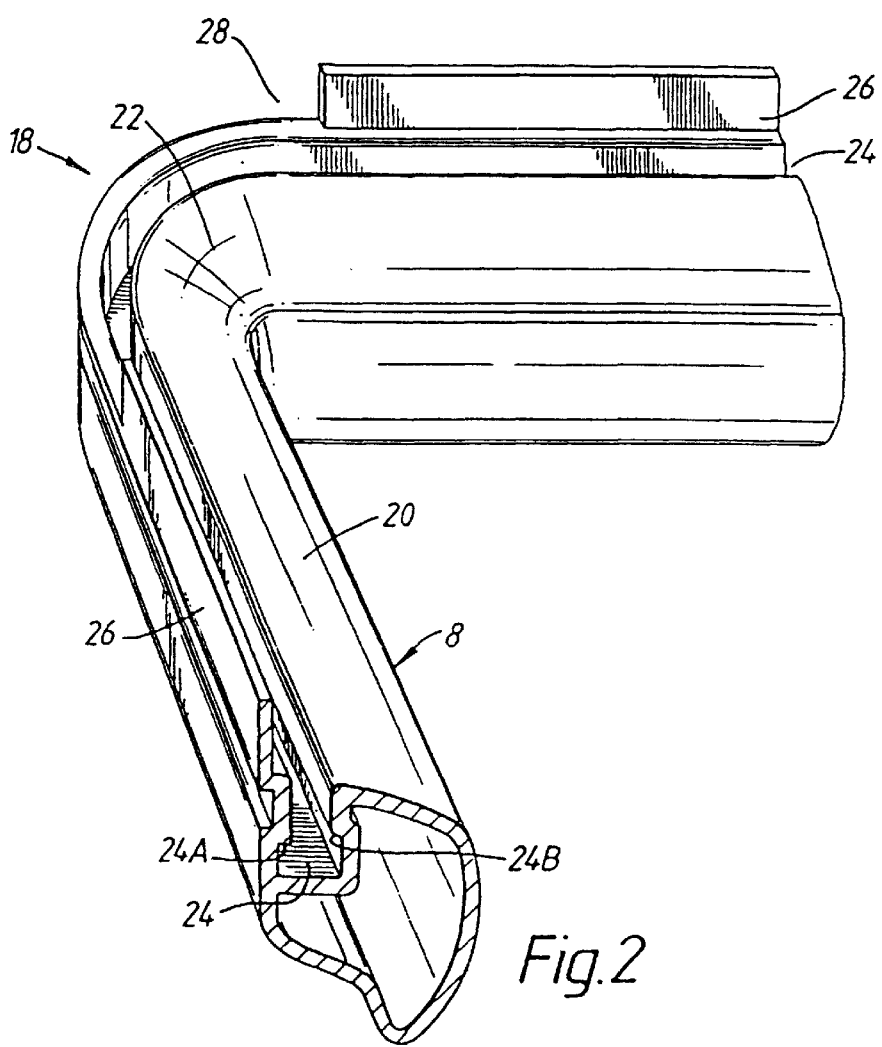
FIG. 2 is a diagrammatic perspective view of part of the window frame shown circle at II in FIG. 1 but omitting the window sealing and guiding strip assembly.

The frame 8 carried by the door is (in this example) made of metal, such as extruded aluminium. FIG. 2 shows part of the frame 8 at the corner 18 and is an enlarged view of the region II of FIG. 1. The sealing and guiding strip assembly is omitted from FIG. 2. As indicated in FIG. 2, the frame is made of a hollow aluminium extrusion 20 which has a curved portion 22 at the position where the sharp corner 18 will be formed in a manner to be described. As shown in FIG. 1, therefore, this curved portion 22 bridges across the position where the sharp corner is to be formed.

Facing outwardly of the vehicle, the aluminium extrusion 20 defines a channel 24 and an outwardly protruding flange 26. However, it will be noted that the flange 26 is interrupted (that is, omitted) over the curved region 22 of the extrusion, so as to form a gap 28. Channel 24 is formed with a narrowed mouth defining shoulders 24A and 24B.

Figure 3:
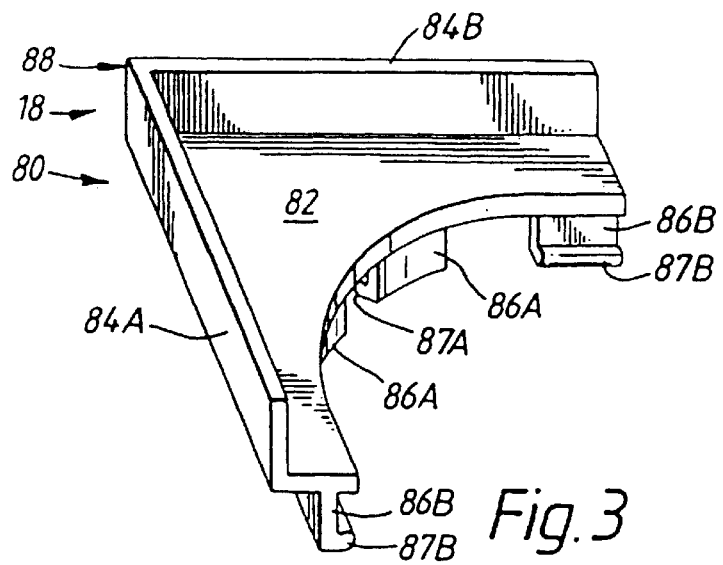
FIG. 3 is a perspective view of a corner support for the sealing and guiding strip assembly.

FIG. 3 shows a corner support 80 which is separately constructed from metal such as aluminium and, in a manner to be explained, is shaped and sized to fit the gap 28 (FIG. 2) to define the sharp corner 18. The corner support 80 is of simple construction comprising a platform 82 which, on its outside, integrally carries flanges 84A and 84B of the same general thickness as the flange 26 on the aluminium extrusion 20 (see FIG. 2) and, on its other side, integrally carries a series of clips 86A and 86B. Clips 86A have hook parts 87A facing outwardly of the sharp corner 18. Clips 86B have hook parts 87B facing inwardly thereof. The corner support 80 is shaped to provide an outside edge 88 which matches the angle of the corner 18. Its opposite edge 90 is curved to match the outside radius of the curved portion 22 (see FIG. 2) of the aluminium extrusion 20.

Figure 4:
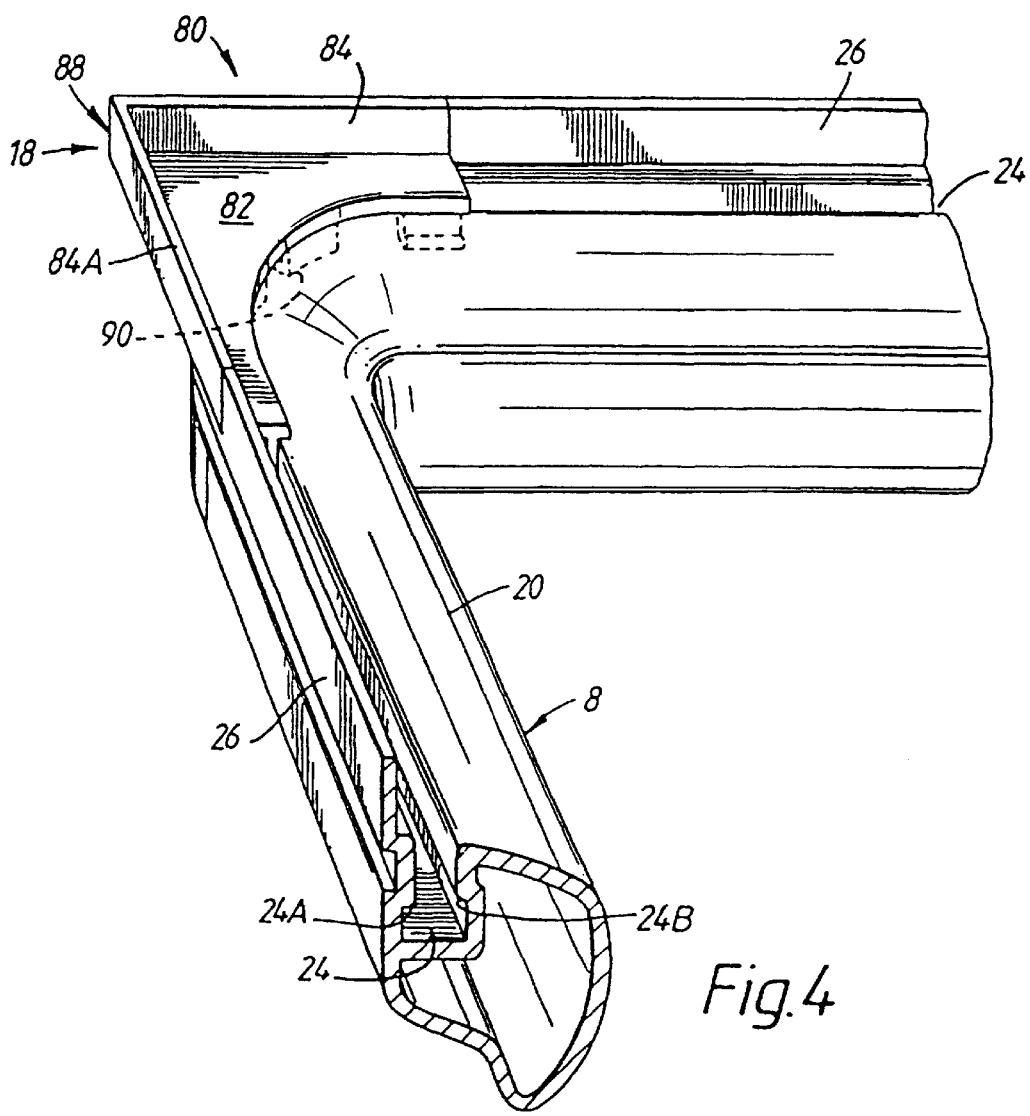
FIG. 4 is a perspective view of the frame of FIG. 2 but also showing the corner support of FIG. 3 in position thereon.

FIG. 4 shows how the corner piece 80 fits in position on the aluminium extrusion 20. The clips 86A and 86B (FIG. 3) of the corner piece 80 are slotted into the channel 24 over the curved region 28 of the aluminium extrusion 20 (FIG. 2). In a manner to be described in more detail, the hook parts 87A of the clips 86A engage under the shoulder 24A while the hook parts 87B of the clips 86B engage under the shoulder 24B. The flange 84 of the corner piece 80 is thus aligned with the flange 26 of the aluminium extrusion; together, they form a continuous flange having a sharp angle 18 (substantially 90°) matching the angle shown at 16 in FIG. 1. In the manner to be explained, this continuous flange, made up of the separate flanges 26 and 82, supports the sealing strip. However, as will also be explained, the corner piece 80 is not in fact fitted in position on the extrusion 20 on its own but only after incorporation into the sealing strip.

Figure 5:
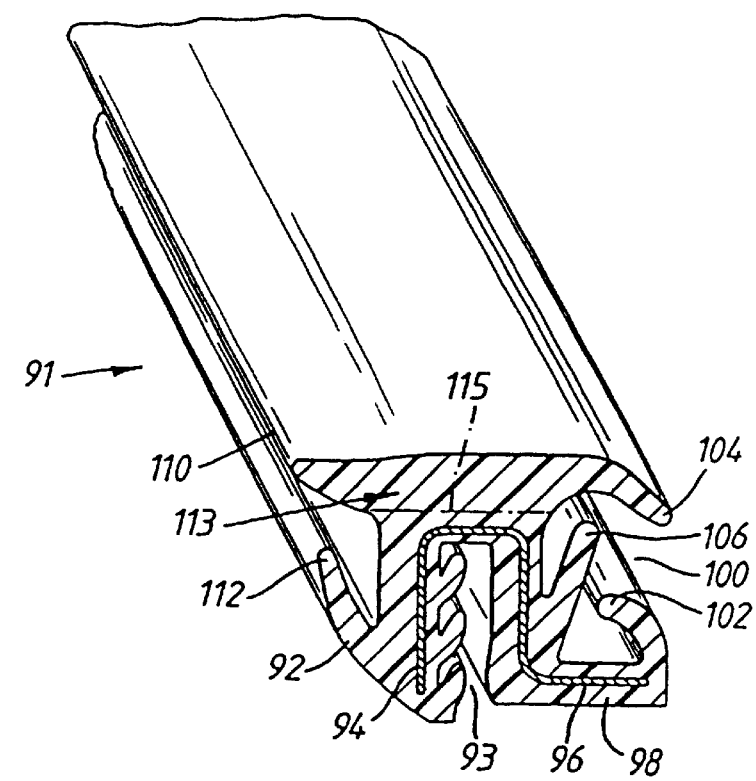
FIG. 5 is a perspective sectional view of a sealing and guiding strip used in the assembly.

FIG. 5 shows one form which the sealing strip 91 can take, along those portions of its length which are supported by the flanges 26; the sealing strip has a different construction where it is supported by the flanges 84A and 84B of the corner piece 80.

As indicated, it comprises extruded material 92, such as plastics or rubber material, which defines a channel 93 and incorporates a channel-shaped metal carrier 94. The carrier 94 may take any suitable form. It may be in the form of a continuous unapertured metal channel. Instead, it may be apertured to increase its flexibility. In another form, it comprises a series of side-by-side generally U-shaped metal elements defining the channel and either entirely disconnected from each other or connected such as by short integral flexible connecting links. In a further form, the carrier comprises looped wire. Other possible forms of carrier may be used, though. As shown, the carrier 94 has an integral extension 96 which extends at right angles to the channel 93.

The carrier extension 96 reinforces a wall 98 of a window glass receiving channel 100. The wall 98 is integral with a re-entrant lip 102, and the opposite wall of the glass-receiving channel 100 is formed by a lip 104. A further lip 106 is mounted on the base of the channel 100.

In use, two lengths of the sealing strip 91 are mounted in position on the two flanges leading towards the corner 18 (FIGS. 2 and 4) by positioning the strip so that the flanges 26 engage in the channel 93. The strip 91 firmly grips the respective flange, the gripping force being assisted by the resilience of the metal carrier 94 and also by the provision of integral flexible lips 108 which extend inwardly of the channel 93. The lips 108 may be extruded so as to be of softer material than the remainder of the extruded material 90, to increase their frictional grip.

In this way, the strips 91 present their glass-receiving channels 100 in the plane of the window opening so that the sliding window glass enters the channel 100. The outwardly facing surfaces of the lips 102 and 106 are coated with flock where they meet the window glass.

As shown in FIG. 5, the sealing strip 91 includes further lips 110 and 112 on the outside of the window frame, that is, on the outside edge of the door. These lips 110 and 112 engage the frame of the door opening when the door is closed, to provide a seal around the edge of the door.

Figure 6:
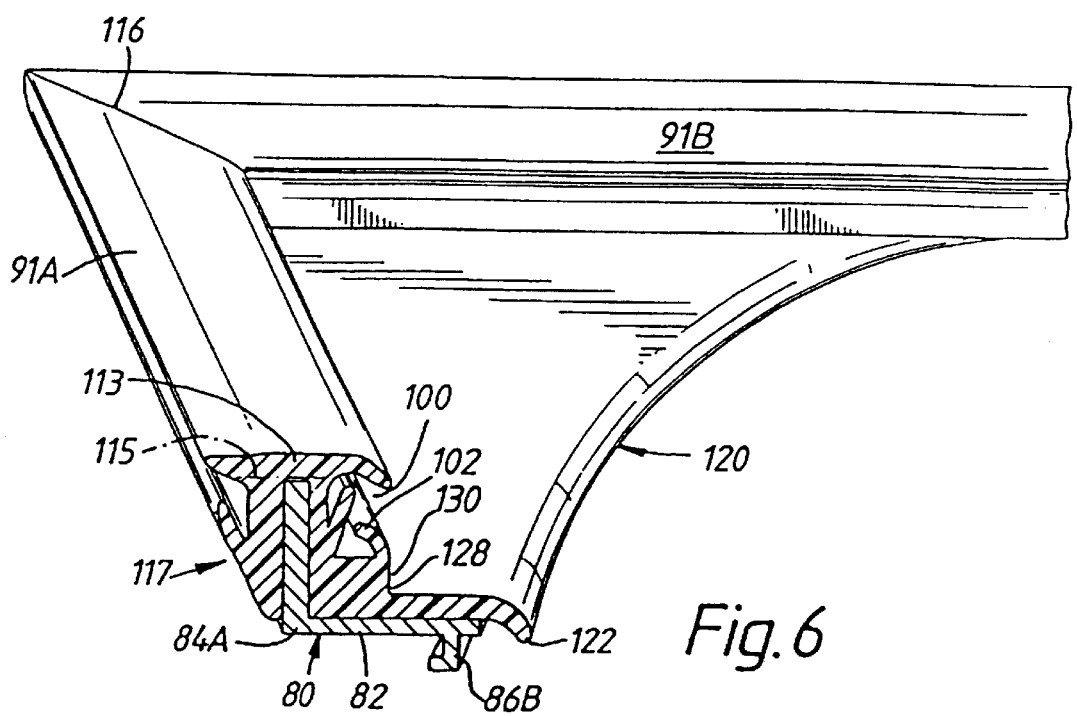
FIG. 6 is a perspective cross-sectional view of the assembly at the corner.

At the corner of the window frame, the sealing strip has a modified construction and this will be described with reference to FIG. 6. As shown in FIG. 6, the upper part of the sealing strip, that is, the part 113 (see also FIG. 5) above a notional plane 115, has the same form as in FIG. 5; two lengths of this part 113 are mitre-cut and then joined together along the line 116 (FIG. 6). However, the remainder of the sealing strip at the corner, that is, the part 117 below the notional plane 115, is of slightly different form. This lower part 117 is produced by a moulding operation so that its cross-section has the same general shape as the lower part of the sealing strip 91 of FIG. 5 and corresponding parts are correspondingly referenced. However, as shown in FIG. 6, the moulding operation also produces a generally triangular-shaped flexible flap portion 120 integrally joined to and extending from the wall 98 (see FIG. 5) of the glass-receiving channel 100. In addition, the moulding operation is arranged to incorporate the corner piece 80 of FIG. 3 into the sealing strip so that it is covered by the moulded flap portion 120.

The manufacturing process involves the production of lengths of sealing strip 91 of the form shown in FIG. 5, such lengths being produced advantageously by extrusion. Separately, the moulding operation described above with reference to FIG. 6 is carried out. The extrusion process produces strips 91 with their upper parts 113 integrally connected to the remainder of the extruded material 92. The carrier 94 may be incorporated by a cross-head extruder technique. However, the moulding operation described above with reference to FIG. 6 only produces the form shown in FIG. 6 below the notional plane 115 (and incorporating the corner piece 80).

During the assembly process, two sealing strips (of FIG. 5) are taken and are each cut through along the notional plane 115 for a length corresponding to the length of one of the flanges 84A, 84B of the corner piece 80.

The lower part of each such length (the part below the notional plane 115 in FIG. 5) is discarded. The upper parts 113 of the two strips are joined together with a mitre join at 116 and are also welded or glued on to the upper surface of the moulded part. The assembled sealing strip is then fitted onto the window frame shown in FIG. 2 by engaging the flanges 26 in the channels 93 of the two lengths 91 of sealing strip and by engaging the clips 86A and 86B (FIG. 3) of the corner piece 80 (which now carries the moulded part) into the channel 24. The extruded top parts 113 completely cover the moulded part and thus conceal the joins between it and the two lengths of sealing strip and also ensure that any slightly different colour which the moulded part may have is not externally visible.

FIG. 7 is a diagrammatic plan view of the assembled sealing strip at the corner 18. The clips 86A and 86B are shown in bold form in FIG. 7. FIGS. 8 and 9 show sections on the lines VIII—VIII and IX—IX of FIG. 7 and illustrate how the hooks 87A and 87B hold the corner piece 80 in position.

The corner piece 120 is formed with a curved-over lip 122 which contacts the surface of the aluminium extrusion 20 (FIGS. 7 and 8).

What is claimed is:

1. A sealing assembly for sealing a sharp-angled corner of a window pane in a frame of a window opening, comprising two strips of extruded flexible material for contacting the window pane and respectively extending towards the corner, each length of flexible material comprising a respective visually apparent surface portion integrally extending over and along a body portion for mounting the length of flexible material on the frame, the body portion of each strip being removed from the surface portion of the strip over a predetermined length of the strip immediately adjacent the corner, molded material matching the shape of the sharp-angled corner and matching the shapes and lengths of the removed body portions and attached to the two strips of flexible material in place of the removed body portions, and a stiff corner piece matching the shape of the sharp corner and incorporated into the molded material during the molding thereof, the respective visually apparent surface portions of the two strips of the flexible material meeting at the sharp-angled corner and overlaying and at least partly concealing and being secured to the molded material.

2. An assembly according to claim 1, in which the stiff corner piece has an outer profile matching the sharp angle of the corner, and a curved inner profile bridging across the sharp angle of the corner.

3. An assembly according to claim 2, in which the molded part includes a moulded flat portion overlaying the stiff corner piece.

4. An assembly according to claim 1, in which the stiff corner piece clippingly engages the frame for the window openings.

5. An assembly according to claim 1, in which the body portion of each said strip of the flexible material defines a channel for receiving the window pane.

6. An assembly according to claim 1, in which the body portion of each said strip of the flexible material defines a channel for securing the flexible material to the frame of the window opening.

7. An assembly according to claim 1 in which the molded material of the molded part defines a channel for receiving the edge of the window pane.

8. An assembly according to claim 1 in which the stiff corner piece includes means for lockably mounting it on the frame of the opening.

9. An assembly according to claim 8, in which the stiff corner piece defines rigid projection means to fit lockingly into a corresponding channel in the frame.

10. An assembly according to claim 1, in which the stiff corner piece defines an edge which is embracingly gripped by the molded material of the molded part.

* * * * *